US012264047B2

(12) United States Patent
König et al.

(10) Patent No.: US 12,264,047 B2
(45) Date of Patent: Apr. 1, 2025

(54) MOBILE CRANE HAVING A COUNTERWEIGHT DEVICE

(71) Applicant: Liebherr-Werk Ehingen GmbH, Ehingen/Donau (DE)

(72) Inventors: Heinz König, Biberach (DE); Peter Scheffold, Ochsenhausen (DE); Tobias Haller, Schnürpflingen (DE)

(73) Assignee: LIEBHERR-WERK EHINGEN GMBH, Ehingen/Donau (DE)

( * ) Notice: Subject to any disclaimer, the term of this patent is extended or adjusted under 35 U.S.C. 154(b) by 0 days.

(21) Appl. No.: 17/839,552

(22) Filed: Jun. 14, 2022

(65) Prior Publication Data

US 2023/0183047 A1 Jun. 15, 2023

(30) Foreign Application Priority Data

Dec. 15, 2021 (DE) ........................ 202021106818 .3

(51) Int. Cl.
*B66C 23/74* (2006.01)

(52) U.S. Cl.
CPC .................................... *B66C 23/74* (2013.01)

(58) Field of Classification Search
CPC . B66C 23/72; B66C 23/74; E02F 9/18; B62D 49/085
USPC .......................................................... 212/195
See application file for complete search history.

(56) References Cited

U.S. PATENT DOCUMENTS 10,822,212 B1 * 11/2020 Dodge, IV .............. B66C 23/76
2017/0253467 A1 9/2017 Zhang et al.
2018/0022586 A1 * 1/2018 Koenig .................... B66C 23/84 212/197
2018/0155162 A1 * 6/2018 Eberhardt ............... B66C 23/74
2019/0169001 A1 * 6/2019 Boos ........................ B66C 23/74
2019/0194000 A1 * 6/2019 Bitz ......................... B66C 23/76

FOREIGN PATENT DOCUMENTS

CN 101624165 B 6/2011
CN 102229414 A * 11/2011
CN 106882712 A * 6/2017
DE 10019863 A1 * 10/2001 ............. B66C 23/74
DE 202006019421 U1 4/2008
DE 202010002364 U1 1/2011
DE 102014223325 A1 * 5/2016 ............. B66C 23/74
DE 202019100134 U1 * 4/2019
WO WO-2017159319 A1 * 9/2017

OTHER PUBLICATIONS

Search Report for corresponding German Application No. 20 2021 106 818.3 (4 pages).

* cited by examiner

*Primary Examiner* — Michael R Mansen
*Assistant Examiner* — Henrix Soto
(74) *Attorney, Agent, or Firm* — The Small Patent Law Group LLC; Christopher R. Carroll

(57) ABSTRACT

The present invention relates to a mobile crane having a travelable undercarriage, a superstructure rotatably supported on the undercarriage, and a counterweight device couplable to the superstructure, wherein the counterweight device comprises a carrier plate on which one or more counterweight elements can be stacked, and at least one connection element extending substantially perpendicular to the carrier plate for coupling the carrier plate to the superstructure.

16 Claims, 4 Drawing Sheets

MOBILE CRANE HAVING A COUNTERWEIGHT DEVICE

CROSS-REFERENCE TO RELATED APPLICATIONS

This application claims priority to German Utility Model Application No. 20 2021 106 818.3 (filed 15 Dec. 2021), the entire disclosure of which is incorporated herein by reference.

BACKGROUND

Technical Field

The present invention relates to a mobile crane in accordance with the preamble of claim 1, to a counterweight device for such a mobile crane, and to a set of a counterweight device and a counterweight base plate.

Discussion of Art

Mobile cranes typically have an undercarriage with a wheeled chassis or a crawler chassis, a superstructure supported rotatably about a vertical axis on the undercarriage, a boom pivotably attached to the superstructure, and a counterweight arrangement also called superstructure ballast. The counterweight produces a counter torque to the load torque via a lever arm in every position of the superstructure and therefore rotates along with the superstructure.

Whereas smaller mobile cranes frequently also take along all the equipment articles for deployment on the construction site in public road traffic as so-called taxi cranes, larger mobile cranes are, however, not able to do this so that it is necessary to dismantle crane components, and in particular the counterweight arrangement, fully or partially for transport in public road traffic and to assemble them on site. The counterweight arrangement typically also has to be dismantled for transport and assembled on the superstructure at the deployment site with crawler cranes.

It is therefore known from the prior art to use a carrier plate having connection means for connection to the superstructure on which carrier plate a plurality of counterweight plates can be stacked and to provide a ballasting device on the superstructure that is able to take up the carrier plate having the counterweight plates stacked thereon at the connection means from the ground and to lift them onto the superstructure. The carrier plate having the counterweight plates can be placed on the ground or on the undercarriage again for dismantling.

For this purpose, the ballasting device typically comprises one or more hydraulic ballasting cylinders that travel downwardly, that are brought into engagement with the connection means of the carrier plate, and that raise the carrier plate having the counterweight plate to the superstructure by retracting.

Cylindrical reception pipes that are welded to the carrier plate and that project perpendicularly upwardly from the carrier plate can be provided as connection means. The counterweight plates have corresponding recesses through which the reception pipes project so that the ballasting cylinders are brought into engagement with the reception pipes from above in the stacked state, for example in combination with a rotational movement of the superstructure. These reception pipes are exposed to high forces in crane operation and therefore typically have stiffening elements in the form of metal stiffening plates that are welded to the carrier plate and to the reception pipe.

One possibility is to design the reception pipe as slit, to plug it via the slit onto the metal stiffening sheet connected to the carrier plate via a first weld connection, and to connect both elements to one another via a second weld connection. Since all the counterweight elements press onto the carrier plate, these weld connections are fully loaded and must therefore be welded with a great effort. The ballasting processes, in particular the pressing of the carrier plate together with the counterweight elements onto the superstructure by means of the ballasting cylinders, represents a great load for the weld connections between the carrier plate and the reception pipe or between the metal stiffening sheet and the reception pipe. This pressing on by the ballasting cylinders may not be neglected since they are adapted to lift a mass of dozens of metric tons (tonnes) and to establish a safe connection between the counterweight and the superstructure. Forces of more than a hundred tonnes can consequently be added here in addition to the weight forces.

The weld connections are therefore always very complex in manufacture and inspection. A higher susceptibility to defects also generally results from a joining together of a plurality of components.

The reception pipes also have to be designed with very thick walls due to the high loads. Sufficient material has to be present to be able to establish the connection to the ballasting cylinders. This is at least the case when very disadvantageous further welds are to be dispensed with. The pipe wall furthermore has to be very thick in comparison with the diameter. Very high prices, long supply times, and large minimum purchase orders result from this.

BRIEF DESCRIPTION

Against this background, it is the underlying object of the present invention to provide a counterweight device for mobile cranes of the category that overcomes the aforesaid problems and in particular manages without avoidable weld connections in the highly loaded regions.

This object is satisfied in accordance with the invention by a mobile crane having the features of claim 1 and by a counterweight device having the features of claim 16. Advantageous embodiments of the invention result from the dependent claims and from the following description.

On the one hand, a mobile crane is accordingly proposed that comprises a travelable undercarriage, a superstructure rotatably supported on the undercarriage, and a counterweight device coupled to the superstructure. A boom, for example a telescopic boom, is in particular furthermore luffably connected to the superstructure in a pivotable manner. The counterweight device comprises a carrier plate on which a counterweight element can be placed or a plurality of counterweight elements can be stacked and at least one connection element extending substantially perpendicular to the carrier plate for coupling the carrier plate to the superstructure.

In accordance with the invention, the connection means has a placement area on which a counterweight element can be placed such that its weight force is introduced into the connection means not into the carrier plate. This is in particular achieved in that the counterweight element substantially only lies on the placement area of the connection means and not on the carrier plate (or at least lies on the carrier plate such that no forces or only minimal forces are introduced into the carrier plate). The counterweight element and all the further counterweight elements that may be provided and that are stacked on the bottommost counterweight element thereby no longer weigh on the carrier plate, but rather on the at least one connection means. The connection between the connection means, which is in particular a weld connection, is thus no longer loaded by the weight force of the stacked counterweight elements, but rather only by the relatively light carrier plate.

The connection means is furthermore formed in one piece in accordance with the invention. The additional weld connection between the mount part and further stiffening structures that would have to take up the weight forces of the counterweight elements is thereby dispensed with. The placement area is part of the one-piece connection means.

A design of the carrier plate and the single or plurality of connection means results from the solution in accordance with the invention that is mechanically advantageous and simple to produce and that can reliably withstand the loads occurring in operation and during the ballasting processes.

The placement area of the at least one connection means can comprise a plurality of individual placement areas. The placement area can extend in parallel with the carrier plate and/or obliquely thereto.

Provision is made in a possible embodiment that the at least one connection means is formed as a one-piece metal sheet construction. The metal sheet construction in particular has a substantially flat form. Such a metal sheet design can be produced more simply than, for example, a cylindrical reception pipe and can be produced with a suitable thickness to withstand the different loads that act along and transversely to the longitudinal axis. The at least one connection means can optionally be produced as a flame-cut part of a thick metal sheet that is easy to obtain, is cheap. and offers large tolerances. The contour can be flame-cut and machined at some parts.

Two placement areas are preferably provided on oppositely disposed sides of the connection means. The bottommost counterweight elements can thereby be supported in a stable manner on the connection means.

Provision is made in a further possible embodiment that the at least one connection means is fixedly connected to the carrier plate. The connection means is preferably welded to the carrier plate, with it in particular being welded to the carrier plate on one side. The connection means in particular does not project through the carrier plate, but is rather only welded from one side, in particular on the upper side.

Provision is made in a further possible embodiment that the at least one connection means has a connection region, via which a coupling can be established with the superstructure, at an end disposed opposite the carrier plate (i.e. facing the superstructure). The connection region can comprise or represent a mount into which a stroke device, in particular a ballasting cylinder, can be traveled to establish a connection for lifting the counterweight device.

The at least one connection means preferably has a smaller width in the (upper) region of the connection region than in the (lower) region of the connection to the carrier plate. The connection means can have the placement area in the lower region on which the bottommost counterweight element lies.

A ballasting device by means of which the counterweight device can be lifted and placed down is provided at the superstructure in a further possible embodiment. The counterweight device can in particular be raised from a placement region of the undercarriage and can be placed down on it.

The ballasting device preferably comprises a hydraulic ballasting cylinder that can be releasably brought into engagement with the connection region of the at least one connection means of the counterweight device. Alternatively or additionally, the ballasting device can comprise a ballast fame that is connectable to the superstructure via fastening means. Said ballast frame can, as described above, be releasably connectable to the superstructure and can optionally comprise a winch construction that can likewise be releasably fastened to the ballast frame.

Provision is made in a further possible embodiment that the connection region of the at least one connection means comprises a recess into which a coupling piece of the ballasting cylinder can be traveled by rotation of the superstructure about its axis of rotation. The coupling piece can be part of the piston rod of the ballasting cylinder or can be connected thereto. The coupling piece can be lockable in the recess, for example by means of a separately provided locking unit. Alternatively or additionally, the locking can result simply by a mechanical stop that blocks a further movement of the coupling piece relative to the connection region.

The recess of the connection region can be configured in a manner known per se such that it allows a lateral pushing in (e.g. following a circular movement) of the ballasting cylinder and blocks a movement of the ballasting cylinder out of the recess in shape matched manner in a vertical direction in the connected state (i.e. in the assembly position in which the counterweight device can be raised by retracting the ballasting cylinder or cylinders). In the raised state, the counterweight device can lie on the coupling piece of the at least one ballasting cylinder or can be suspended at it via the recess of the at least one connection means.

In a further possible embodiment, a counterweight base plate having a recess is provided through which the connection means projects in the placed down state of the counterweight base plate. The counterweight base plate in particular represents the bottommost counterweight element of the counterweight device on which all, or optionally additionally provided, further counterweight elements can be placed or stacked. The counterweight base plate lies on the support surface of the at least one connection means, and indeed in particular such that it does not contact the carrier plate in the placed down state (at least does not contact its upper side—a lateral contact does not result in any significant load on the connection between the connection means and the carrier plate if the counterweight base plate is wider than the carrier plate.

An intermediate counterweight element that can be placed on the carrier plate between the carrier plate and the counterweight base plate and has a recess through which the connections means projects in the placed down state is provided in a further possible embodiment. The intermediate counterweight element is preferably smaller and/or lighter than the counterweight base plate and can be advantageous in a special equipment state of the mobile crane. It can, for example, be taken along or not taken along for road travel.

The intermediate counterweight element preferably lies fully or partially on the carrier plate and introduces at least some of its weight force, optionally, however, also the total weight force, into the carrier plate. Provision can alternatively or additionally be made that the counterweight base plate lies at least partially on the intermediate counterweight element. In this case, the contact between the counterweight base plate and the intermediate counterweight element preferably nevertheless does not transmit any or only transmits low forces so that the counterweight base plate still introduces the weight force predominantly or completely directly into the at least one connection means.

In a further possible embodiment, at least one further counterweight element is provided that can be placed or stacked on the counterweight base plate and has a recess through which the connections means projects in the placed down state. The at least one further counterweight element is in particular of plate shape. A plurality of further counterweight elements are preferably provided that can be stacked on the counterweight base plate. The recesses of all the counterweight elements here overlap at least in part so that the at least one connection element can project through and is accessible from above.

Provision is made in a further possible embodiment that the recess of at least one further counterweight element is configured such that the coupling piece of the ballasting cylinder can be positioned within the recess beside the connection region of the connection means and can be traveled into the connection region by rotation of the superstructure about its vertical axis of rotation. The ballasting cylinder here describes a circular path and travels laterally into the connection region. The cutout of at least those counterweight elements that lie at the level of the connection region and thereabove therefore have to be correspondingly wider to permit such a circular movement on the coupling of the ballasting cylinder with the connection means. The counterweight elements lying therebelow and also the counterweight base plate can in contrast be configured differently so that only the connection means substantially passes through.

The recess preferably has a mechanical stop which the coupling piece abuts in an assembly position in which the ballasting cylinder and the connection means are correctly coupled in which the counterweight device can therefore be raised by the at least one ballasting cylinder. The stop can be formed by a wall of the recess itself, whereby a particularly simple embodiment results. Alternatively, the stop can also be implemented by a component arranged in the recess.

Provision is made in a further possible embodiment that the at least one connection means comprises at least one stop element for fastening a stop means (e.g. a chain or a rope) of lifting equipment for raising the carrier plate. The carrier plate together with the connection means can thereby be raised by an auxiliary crane or by the mobile crane to be equipped itself and can be positioned on a placement region on the undercarriage of the mobile crane. The stop element is preferably formed by a recess of the connection means. Hook elements, projections, or the like are also conceivable to be able to fasten the stop means.

More than one connection means are preferably provided for a stable support of the counterweight elements and for the connection of the counterweight device at the superstructure. In a further possible embodiment, the carrier plate therefore comprises at least two mutually spaced apart connection means. Exactly two connection means can be provided or also more than two connection means.

The connection means are preferably arranged rotated with respect to one another (about the vertical axis), i.e. their connection regions do not exactly face one another. This can be due to the circumstance that the ballasting cylinders (just as many ballasting cylinders as connections naturally have to be provided) are moved on a circular path by rotation of the superstructure to establish the coupling with the connection means. The connection means are in particular designed as flat metal sheet constructions that are not aligned in parallel, but rather inclined at a specific angle to one another.

Alternatively or additionally, the connection means can be arranged at the same distance from the center of gravity or from a center line of the carrier plate (that is preferably in parallel with the longitudinal axis of the superstructure). An axially symmetrical arrangement of the carrier plate and the connection means can thereby result overall.

In a further possible embodiment, an upper and in particular plate-like counterweight element is provided that has at least one force introduction means, preferably a plurality of force introduction means. The at least one force introduction means is in particular located at the surface of the upper counterweight element or a plurality of force introduction elements are preferably arranged distributed over the surface.

The at least one force introduction means is preferably arranged and configured such that, on the raising and pressing of the counterweight device on the superstructure by means of a ballasting device of the mobile crane (in particular by means of a plurality of ballasting cylinders), the total counterweight device is supported at the at least one force introduction means and the force flow from at least one force introduction means into the at least one connection means does not substantially take place via the carrier plate. The connection, in particular the weld seam, between the connection means or plurality of connection means and the carrier plate is thus located outside the force flow on the pressing of the counterweight device onto the superstructure so that the very high forces that typically occur here do not strain this connection. The force flow in particular takes place here from the at least one force introduction means through the counterweight elements via the mount surface(s) into the at least one connection means.

The upper counterweight element preferably has at least one fastening means for a direct fastening of the upper counterweight element to the superstructure. The at least one fastening means can simultaneously represent the at least one force introduction means or can comprise it. The fastening can take place via screws and/or via pin connections.

It is thereby possible not to dismantle the topmost counterweight element (and optionally a second counterweight element lockable therewith) for transport and to transport them separately, but rather instead to fixedly connect it/them to the steel construction of the superstructure to vary or to better utilize the axial loads on the traveling of the mobile crane in public road traffic (with a mobile crane having a wheeled chassis). When the counterweight is removed, the topmost ballast element therefore does not move back to the undercarriage from which the placed down remaining counterweight device is then removed and placed on a separate transport vehicle. The nationally permitted axial loads can thereby be better utilized that selectively no, one or two or more counterweight elements (that are in this case connectable to the topmost counterweight element via a separate locking mechanism) remain(s) at the superstructure for the public road travel.

The mobile crane in accordance with the invention can have a ballast frame that supports the ballasting cylinder or cylinders and optionally a winch attachment. The ballast frame can be releasably connectable to the frame structure of the superstructure via corresponding fastening elements such as pinning points so that it can, for example, likewise be dismantled from the superstructure for transport. The assembly of the ballast frame at the superstructure can take place via the ballasting cylinders (that lift the ballast frame by extending from the undercarriage to the superstructure) or via lifting equipment (e.g. via the boom of the mobile crane itself or by means of an auxiliary crane).

Provision is made in a further possible embodiment that the connection means has at least two placement areas that are spaced apart from one another along the longitudinal axis of the connection means and on which a respective counterweight element can be placed such that its weight force is introduced into the connection means and not into the carrier plate or into a counterweight element disposed thereunder. In this case, not only the bottommost counterweight element can therefore be supported on the at least one connection means and can introduce its weight force directly into it, but rather also one or more counterweight elements arranged thereabove are each disposed on corresponding placement areas and introduce their weight force directly into the connection means and not into the counterweight elements arranged thereunder. The topmost counterweight element can also lie on its own placement area of the connection means. The counterweight elements that lie on such placement areas preferably do not contact the respective counterweight element disposed thereunder.

Provision is made in a further possible embodiment that the placement areas spaced apart from one another along the longitudinal axis of the connection means, i.e. the placement areas belonging to different counterweight elements, are each arranged at different distances from the a center plane of the connection means. The center plate preferably divides the connection means into two axially symmetrical halves. In the region in which the different placement areas are arranged, the connection means preferably has a width that reduces in steps. The width preferably reduces step-wise upwardly (away from the carrier plate). The respective counterweight elements can thereby be gradually threaded onto the single or plurality of connection means and each lie on separate placement areas of the connection means. The different counterweight elements can accordingly have differently sized recesses for the connection means whose widths are adapted to the width of the connection means in the region of their intended placement areas.

The placement areas can all be formed as flat and extend perpendicular to the longitudinal axis of the connection means. It is likewise conceivable that the placement areas are at least sectionally chamfered and/or rounded.

The present invention furthermore relates to a counterweight device for a mobile crane in accordance with the invention. In this respect, the same advantages and properties obviously result as for the crane in accordance with the invention so that a repeat description will be dispensed with at this point.

The present invention further relates to a set of a counterweight device in accordance with the invention and a counterweight base plate. The set preferably furthermore comprises at least one further counterweight element and/or an upper counterweight element as previously described.

BRIEF DESCRIPTION OF THE DRAWINGS

Further features, details, and advantages of the invention result from the embodiment explained in the following with reference to the Figures. There are shown.

DETAILED DESCRIPTION

Figure 1:
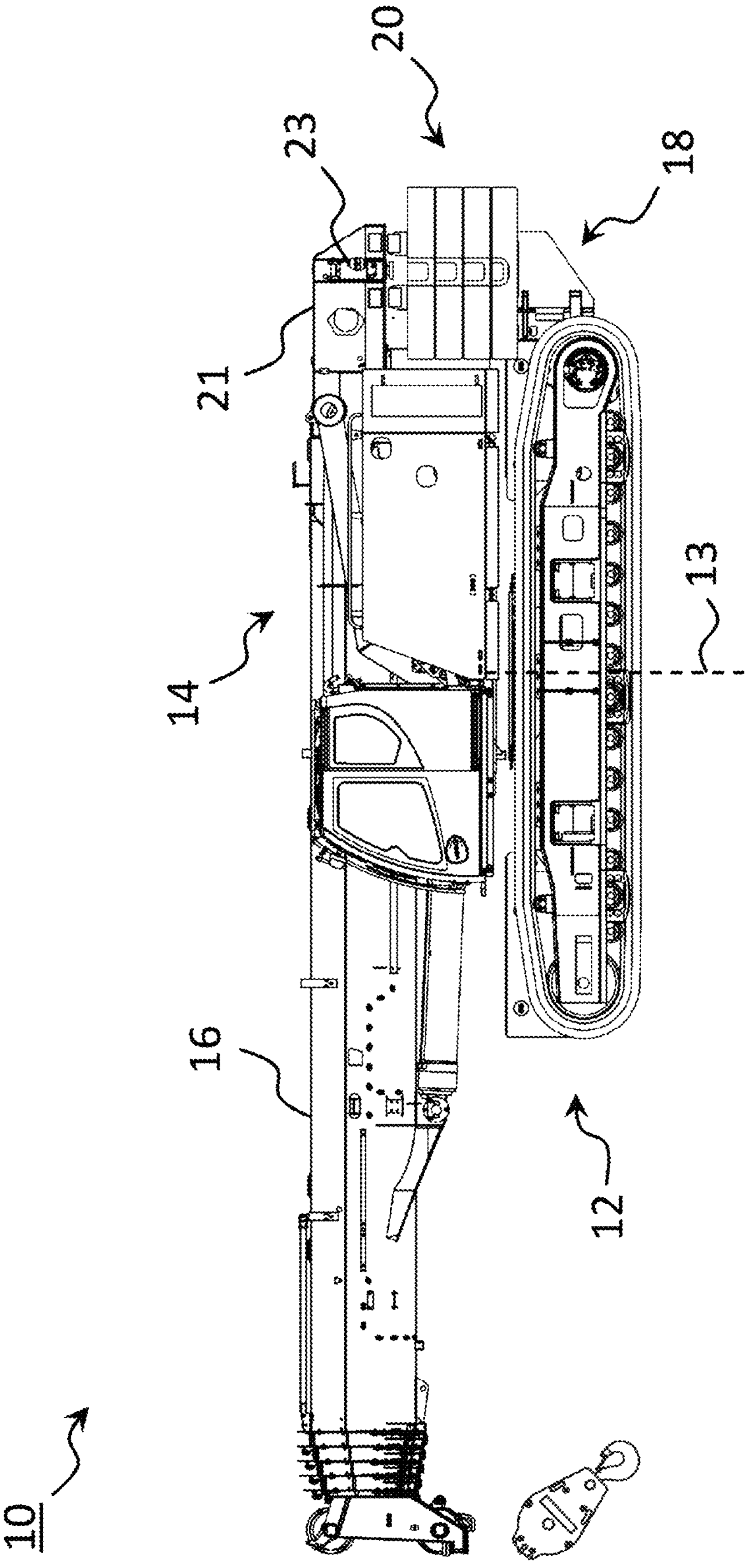
FIG. 1: the mobile crane in accordance with the invention in accordance with an embodiment in a side view.

An embodiment of the mobile crane 10 in accordance with the invention in the form of a crawler crane is shown in a side view in FIG. 1. The mobile crane 10 has an undercarriage 12 having a crawler chassis and a superstructure 14 supported on the undercarriage 12 rotatable via a slewing gear about a vertical axis of rotation 13. The superstructure 14 comprises a telescopic boom 16 supported luffably about a horizontal axis and a counterweight arrangement also called superstructure ballast.

The superstructure ballast in this embodiment comprises a ballast frame 21 that is connected to the steel structure of the superstructure 14 via pin connections and that can be removed from the superstructure 14 for transport. Two hydraulic ballasting cylinders 23 whose piston rods can be downwardly extended are received at the ballast frame 21. A counterweight device 20 can be lifted from a placement region at the superstructure 14 and can be connected thereto via the ballasting cylinders 23. In this embodiment, the placement region is formed by a foldable placement device 18 in the rear of the undercarriage 12, with the placement region also being able to be located at an upper side of the undercarriage or on the ground. Conversely, the counterweight device 20 can be placed down on the placement device 18 again via an extension of the ballasting cylinders 23 and can be loaded onto a transport vehicle from there, optionally by means of an auxiliary crane or the boom 16 of the mobile crane 10 itself.

The counterweight device 20 comprises a carrier plate 22 on which a plurality of counterweight elements 24, 25, 26, 28 can be stacked. The superstructure ballast can thereby be variably configured and can be adapted to the desired deployment. The coupling of the counterweight device 20 with the superstructure 14 or with the ballasting cylinders 23 takes place via connection means 30 that project perpendicularly upwardly from the carrier plate 20 and that have connection regions 34 for a reversible coupling with the ballasting cylinders 23 at their upper ends.

Figure 2:
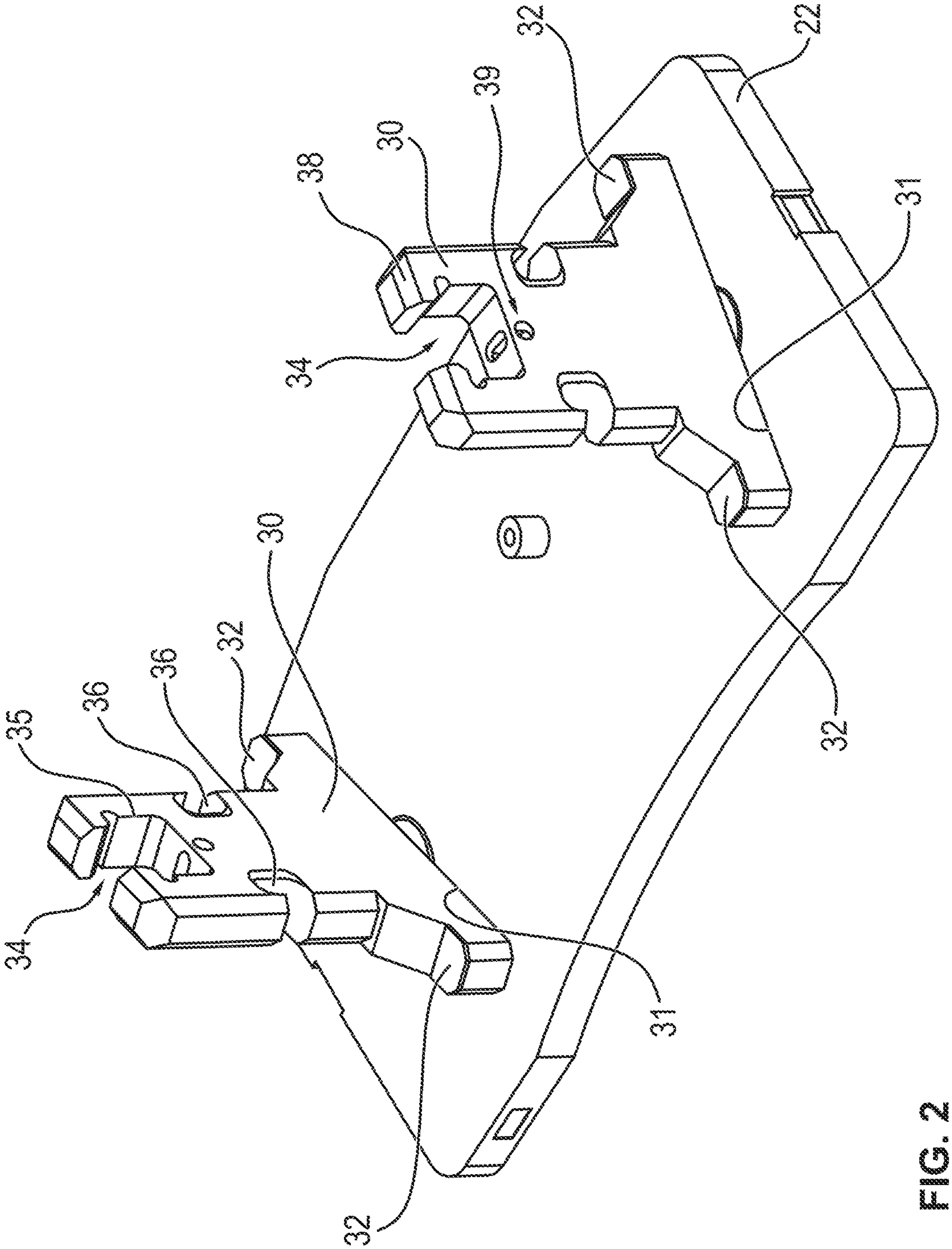
FIG. 2: the carrier plate with connection means without counterweight elements in a perspective view.
Figure 3:
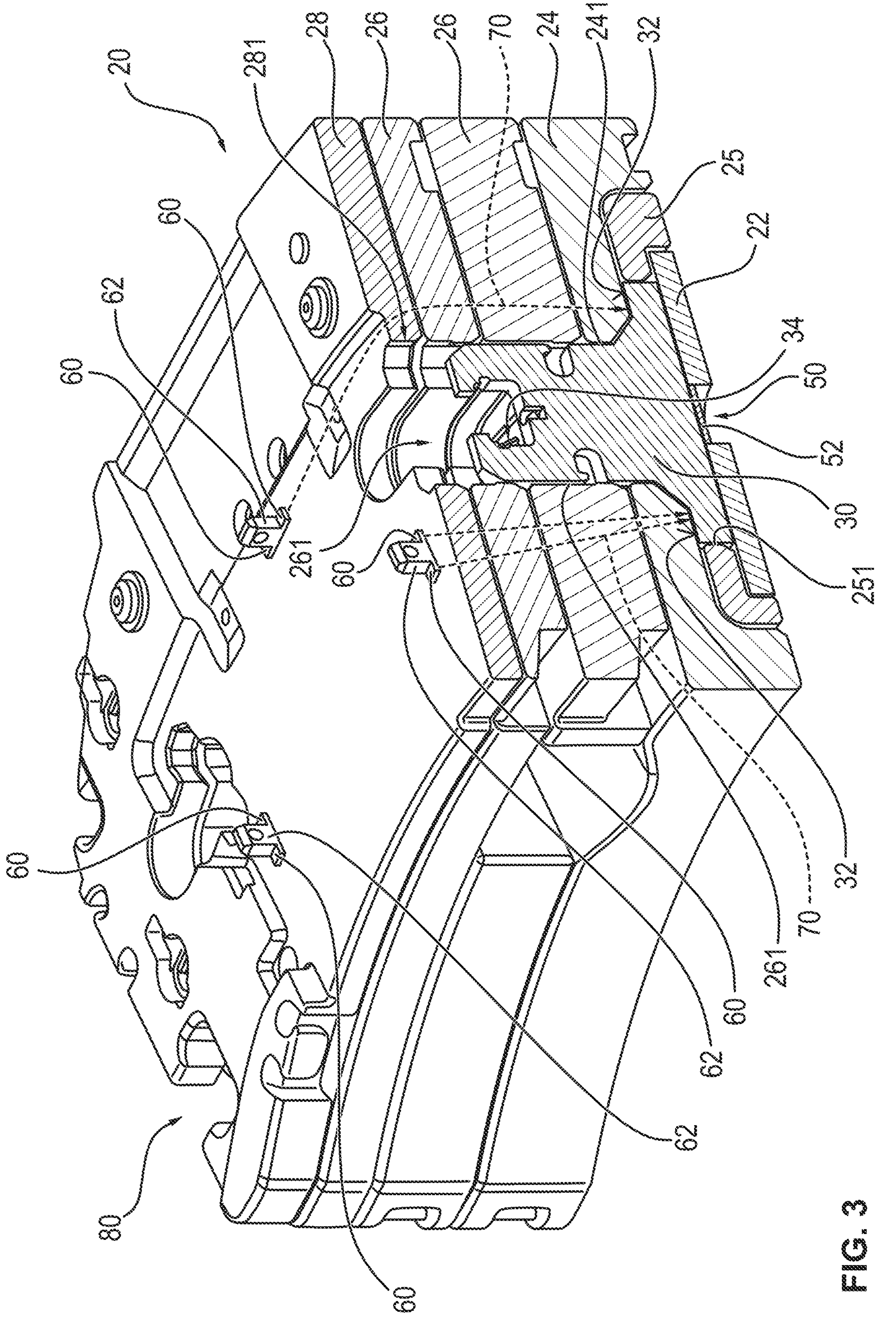
FIG. 3: a perspective sectional view through the counterweight device in the region of a connection means with counterweight elements stacked on in accordance with the first embodiment.

A preferred embodiment of the carrier plate 22 together with connection means 30 is shown perspectively in FIG. 2. A section through one of the connection means 30 and the carrier plate 22 with counterweight elements 24, 25, 26, 28 stacked thereon in accordance with an embodiment is shown in FIG. 3.

The connection means 30 are metal sheet constructions that are produced in one piece and that are fastened, in particular welded, to the upper side of the carrier plate 22. The weld connection is marked by the reference numeral 31 in FIG. 2. The connection means 30, that could also be connection struts or simply struts, have a flat basic shape that tapers upward to a connection region 34 from its widest extent in the connection region having the carrier plate 22. In the embodiment shown here, the connection means 30 more precisely have a lower region that is substantially trapezoidal, that merges into a straight region or into a region having a constant width, but that has various recesses 35, 36 which will be looked at further below.

The indications of direction “upward” and “downward” used herein relate to the case that the carrier plate 22 (and the mobile crane 10) stand on a level base. In this case, the connection means 30 extend perpendicularly upwardly from the carrier plate 22.

The trapezoidal regions of the connection means 30 each have two placement areas 32 that each form a flat, horizontal surface (and can together be called a "placement area" of the respective connection means 30). The bottommost counterweight element 24 of the counterweight arrangement 20 in accordance with the embodiment shown here, called a counterweight base plate 24 in the present case, lies on the four placement areas 32 of the connection means 30 in the placed down state and introduces its weight force directly into the connection means 30 via these contact surfaces. Since all the further counterweight elements 26, 28 arranged thereabove lie or are stacked on the counterweight base plate 24 and every further counterweight plate 26, 28 is supported on the respective counterweight plate 24, 26 disposed thereunder, its total weight does not weigh on the carrier plate 22, but rather on the connection means 30.

The counterweight base plate 24 preferably does not contact the carrier plate 22 at all, i.e. there is a spacing therebetween. Provision can naturally also be made that the counterweight base plate 24 is supported at or contacts the carrier plate 22 to a certain extent, but without introducing a significant portion of its weight force into the carrier plate 22. It is likewise conceivable that the placement areas 32 do not extend or do not exclusively extend horizontally, but are e.g. inclined.

The weld connection 31 between the connection means 30 and the carrier plate 22 is relieved by the support on the placement areas 32 since it substantially only has to take up the weight force of the carrier plate 22 itself.

The counterweight base plate 24 preferably has especially machined surfaces, that lie on the placement areas 32 of the connection means 30 in the placed down state, at its lower side at points complementary to the placement areas 32.

In addition, as shown in the embodiment in accordance with FIG. 3, a comparatively small or light intermediate plate 25 (=intermediate counterweight element) can be provided that is arranged between the counterweight base plate 24 and the carrier plate 22 and lies on the latter. This can be advantageous on a special equipment state of the mobile crane 10 and can optionally be taken along or not taken along for the road travel. The loads induced by the small intermediate plate 25 are to be removed via the weld connection 31.

Alternatively, the counterweight base plate 24 could also be configured such that it utilizes the space present even over a larger volume and has a greater mass. In every case, however, a sufficient distance from the carrier plate 22 is preferably present in order not to introduce any loads from the counterweight base plate 24 into the carrier plate 22.

Since the connection means 30 do not consist of a plurality of connected parts, but are rather formed in one piece, weld connections that are complicated to manufacture and that have correspondingly high demands do not have to be provided.

The carrier plate 22 in particular has the following objectives:

positioning the connection means 30 for the equipping of the counterweight device 20 by the ballasting cylinders 23 on the superstructure 14;

positioning the carrier plate 22 on the undercarriage 12, for example on a placement device 18 such as shown in FIG. 1. The connection means or coupling pieces of the ballasting cylinders 23 can thus engage into the connection regions 34 of the connection means 30. This positioning has to take place very precisely since it in particular takes place by means of a rotational movement of the superstructure 14 about the axis of rotation 13 on the undercarriage 12;

the carrier plate 22 furthermore has to hold the connection means 30 securely in position, even when transverse forces occur. Such transverse forces can occur, for example, when the ballasting cylinders 23 rotate into the connection regions 34 and abut or rub at or in them. The transverse forces can also occur with slanted positions due to the weight forces.

The counterweight base plate 2434 has corresponding, in particular slit-like, recesses 241 through which the connection means 30 project. The counterweight plates 26 disposed thereabove and the topmost counterweight plate 28 likewise have corresponding recesses 261, 281. The connection means 30 are preferably completely surrounded by all the counterweight elements 24, 26, 28.

The optionally provided intermediate plate 25 also has corresponding recesses 251 and preferably surrounds the connection means 30.

The connection regions 34 at the upper ends of the connection means 30 comprise clip-like recesses 35 into which the especially shaped ends or coupling pieces of the ballasting cylinders 23 travel at the side. In the assembly position, the coupling pieces are located completely within the recesses 35 that due to their shape enable a shape matched raising of the counterweight arrangement 20 by retracting the ballast cylinders 23 since the coupling pieces cannot travel upwardly out of the recesses 35, but rather abut them.

The coupling of the ballasting cylinders 23 with the connection means 30 in particular takes place by a rotation of the superstructure 14 about its axis of rotation 13. The recesses 261, 281 of at least the counterweight elements disposed at the height of the connection regions 34 (they are the topmost two counterweight plates 26, 28) in FIG. 3 are therefore not formed as slit-like, but are rather widened in the direction of rotation of the superstructure 14 so that the ballasting cylinders 23 can be retracted downwardly beside the connection means 30 into the recesses 261, 281 until the coupling pieces are at the level of the recesses 35 of the connection regions 34. A coupling can then be established by rotating the superstructure 14.

To enable this circular movement of the ballasting cylinders 23 or a corresponding coupling, the connection means 30 are not in parallel with one another, but adopt an angle with one another. More specifically, the planes in which the connection means 30 are disposed run apart from one another in a direction directed away from the axis of rotation 13 of the superstructure.

The connection means 30 are in particular welded onto the carrier plate 22 without any special projections or setbacks by the weld connection 31. By this the relative position of the two connection means 30 with respect to one another is defined so that the recesses 241, 251, 261, 281 of the further counterweight plates 24, 25, 26, 28 can correctly take up the two connection means 30;

the position of the placement areas 32 is defined to take up the machined surfaces at the counterweight base plate 24 at defined points; and the correct positioning of the connection regions 34 in relation to the carrier plate 22 is ensured at defined points.

So that the coupling pieces of the ballasting cylinders 23 are not moved through the connection regions 34, but rather reach their correct assembly position, the recesses 261, 281 are preferably configured such that their walls form corresponding mechanical stops for the coupling pieces. An overrun of the ballasting cylinders 23 is thereby effectively prevented.

In the assembly position, the ballasting cylinders 23 and the connection means 30 can preferably be reversibly locked with one another.

The connection means 30 can have chamfered edges or bevels 38 at the upper side to facilitate a threading of the counterweight elements 24, 26, 28.

In the embodiment shown here, the bevels 38 of the connection means 30 additionally may be mounts for connection to a fall protection in the connection regions 34 (or at the lower sides of the recesses 35).

The connection means 30 have recesses 39 laterally at the straight (upper) regions that serve as stop elements for fastening stop means (e.g. a chain or a rope) of a crane for handling the carrier plate 22.

Gray iron can be provided as the material for the counterweight plates 24, 25, 26, 28 and/or for the carrier plate 22.

The cutout 50 in the lower side of the carrier plate 22 to be recognized in FIG. 3 centrally below the connection means 30 may serve as a centering means for the correct positioning of the carrier plate 22 on the placement region of the undercarriage 12. The latter preferably has corresponding projections as counter-centering means that travel into the cutouts 50. The connection means 30 are thereby always in their correct position for equipping the counterweight device 20 that is in particular known to the crane control.

The cutouts 50 can extend, as can be seen in FIG. 3, through the whole carrier plate 22 and can be covered by a plate 52. Alternatively, the cutouts 50 could also end within the carrier plate 22. The cutouts 50 serving as the centering means can naturally be provided at a different point than below the connection means 30.

To enable a positioning of the carrier plate 22 at different distances from the axis of rotation 13 (e.g. in combination with ballasting cylinders 23 adjustable in their relative position to the axis of rotation 13 of the superstructure), more than two cutouts 50 serving as centering means 50 can be provided, such as described, for example, in DE 10 2015 013 488 A1.

As can be recognized in FIG. 3, the topmost counterweight plate 28 can have a series of fastening means 62 that are configured as cast parts having recesses for establishing pin connections to the ballast frame 21 in the present embodiment. As required, the topmost counterweight plate 28 can thereby be directly connected to the steel construction of the superstructure 14, for example to travel the mobile crane 10 with a reduced counterweight. The remaining counterweight device 22, 24, 25, 26, 30 can still be removed from the superstructure 14.

Provision can furthermore optionally be made that the topmost two counterweight plates 26, 28 can be releasably lockable with one another so that not only the topmost, but rather both counterweight plates 26, 28 can remain at the superstructure 14.

The fastening means 62 furthermore comprise contact points that act as force introduction means 60 (cf. FIG. 3). They can cooperate with corresponding contact elements or contact points at the ballast frame 21. The total counterweight device 20 is supported at the force introduction means 60 when the ballasting cylinders 23 press them against the ballast frame 21 to establish the connection between the counterweight device 20 and the superstructure 14. As described above, huge forces can occur here. A force flow (shown by the arrows 70 in FIG. 3) results on the pressing on through the counterweight elements 24, 26, 28 and directly into the connection means 30 via the placement areas 32 due to the design in accordance with the invention and the arrangement of the carrier plate 22, connection means 30, their placement areas 32 and the force introduction means 60. Said connection means 30 conduct the forces further in themselves and via the connection regions 34 and the ballasting cylinders 23 back into the ballast frame 21 or superstructure 14. The weld connections 31 between the carrier plate 22 and the connection means 30 are outside this force flow 70.

The weld connections 31 between the carrier plate 22 and the connection means 30 therefore only "see" the weight forces of the carrier plate 22 itself and optionally the relatively light intermediate plate 25 and therefore do not have to be designed for the huge forces that otherwise occur.

It is conceivable in principle that the ballasting cylinders 23 can hold the counterweight device 20 at the superstructure 14 during crane operation and can optionally be locked (e.g. mechanically and/or hydraulically). However, connection elements, not shown in any more detail here, are preferably provided at the connection means 30 and corresponding counter-connection elements are provided at the ballast frame 21 via which the connection can be established, for example in the form of pin connections.

The carrier plate 22 and the counterweight elements 24, 25, 26, 28 in the embodiment shown here are formed in one piece and slightly curved for swung.

The topmost counterweight element 28 (and optionally also the counterweight element 26 arranged thereunder) can have cutouts 80 at the sides that enable a hooking in of hang-in ballast elements (=hang-in connection means). In the embodiment shown in FIG. 3, the cutouts 80 are formed as T grooves.

Figure 4:
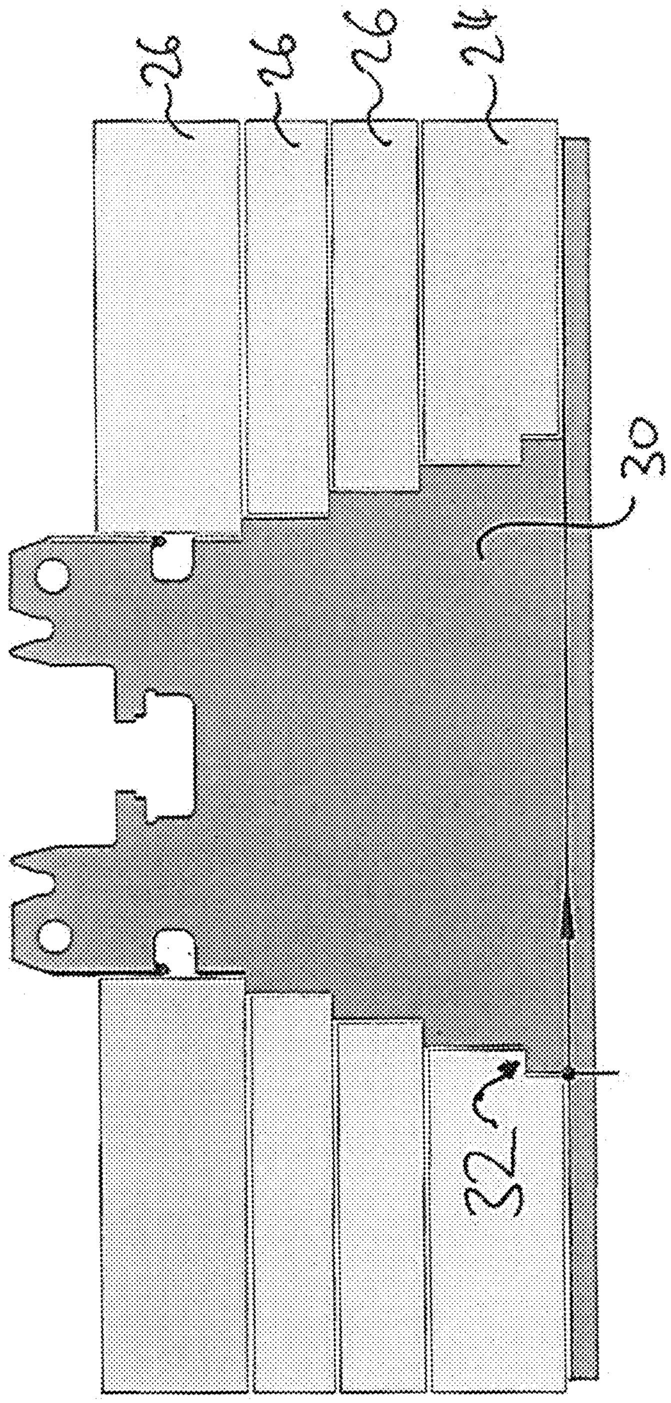
FIG. 4: a lateral sectional view through a connection means of the counterweight device with counterweight elements stacked on in accordance with a second embodiment.

A second embodiment of the counterweight device 20 in accordance with the invention is shown in FIG. 4. A section through a connection means 30 can be seen onto which a plurality of counterweight elements 24, 26 have been placed. In contrast to the first embodiment, the connection means 30 here not only has a placement area 32 for the bottommost counterweight element 24, but also a plurality of placement areas 32 on which the remaining counterweight elements 26 lie. In other words, every counterweight element 24 lies on its own placement area 32 of the connection means 30 so that it does not introduce its weight force into the counterweight element 24, 26 disposed thereunder (or into the carrier plate 22), but rather directly into the connection means 30 (or into the connection means 30). The connection means 30 has a step-like structure, with the upper sides of these "steps" forming the respective placement areas 32. The width of the connection means 30 thus reduces step-wise upwardly toward the connection region 34 starting from the carrier plate 22.

What is claimed is:

1. A mobile crane having a travelable undercarriage, a superstructure rotatably supported on the undercarriage, and a counterweight device couplable to the superstructure, wherein the counterweight device comprises a carrier plate on which one or more counterweight elements are stacked, and at least one connection element extending upward from the carrier plate to a connection region that couples the carrier plate to the superstructure for the counterweight device to be lifted by the superstructure, wherein the at least one connection element has at least two separate and spaced apart placement areas on which the one or more counterweight elements are placed such that (a) the one or more counterweight elements are not in contact with the carrier plate, (b) weight of the one or more counterweight elements is introduced into the at least one connection element, and (c) no force from the weight of the one or more counterweight elements is introduced onto the carrier plate when lifted by the counterweight device, wherein the at least one connection element includes at least two steps in a step structure with upper sides of the at least two steps forming multiple pairs of the at least two separate and spaced apart placement areas, the at least two steps forming the pairs of the at least two separate and spaced apart placement areas disposed at different heights above the carrier plate and disposed at different widths from a center of the at least one connection element with the at least two steps located closer to the carrier plate being wider than the at least two steps located farther from the carrier plate, each of the at least two steps for receiving and supporting different ones of the counterweight elements to be supported upon while the counterweight elements are stacked on the at least one connection element without contacting the carrier plate.

2. The mobile crane in accordance with claim 1, wherein the at least one connection element is formed as a one-piece metal sheet construction having a substantially flat form.

3. The mobile crane in accordance with claim 1, wherein the at least one connection element is fixedly connected to the carrier plate with the at least one connection element welded to the carrier plate on one side.

4. The mobile crane in accordance with claim 1, wherein the at least one connection element has the connection region at an end oppositely disposed the carrier plate via which the at least one connection element is coupled with the superstructure with the at least one connection element having a smaller width in a region of the connection region than in a region of a connection to the carrier plate.

5. The mobile crane in accordance with claim 1, further comprising a counterweight base plate having a recess through which the at least one connection element projects in a placed down state with the counterweight base plate positioned to be placed onto the at least two separate and spaced apart placement areas of the at least one connection element such that the counterweight base plate does not contact the carrier plate in the placed down state and does not introduce any load into the carrier plate.

6. The mobile crane in accordance with claim 5, wherein the recess of the counterweight base plate is sized to receive a portion of at least one hydraulic ballasting cylinder beside a connection region of the at least one connection element.

7. The mobile crane in accordance with claim 1, wherein the at least one connection element comprises at least one lateral recess sized to receive a chain or a rope of the mobile crane.

8. The mobile crane in accordance with claim 1, wherein the at least one connection element includes at least two mutually spaced apart connection elements that are one or more of: (a) arranged rotated with respect to one another or (b) at a common distance from a center of gravity of the carrier plate.

9. The mobile crane in accordance with claim 1, wherein the carrier plate comprises a centering cutout on a lower side of the carrier plate extending through all of the carrier plate for positioning the carrier plate on the undercarriage.

10. The mobile crane in accordance with claim 1, wherein the carrier plate together with the at least one connection element has an axially symmetrical structure or the carrier plate has a swept shape.

11. The mobile crane in accordance with claim 1, further comprising an upper counterweight element having at least one force introduction element arranged and configured such that on raising and pressing of the counterweight device on the superstructure by means of a ballasting device of the mobile crane, the counterweight device is supported on the at least one force introduction element and a force flow from the at least one force introduction element into the at least one connection element substantially does not take place via the carrier plate, with the upper counterweight element having a fastener for a direct fastening of the upper counterweight element to the superstructure.

12. The mobile crane in accordance with claim 1, further comprising:

a counterweight base plate having a recess through which the at least one connection element projects in a placed down state with the counterweight base plate positioned to be placed onto the at least two separate and spaced apart placement areas of the at least one connection element such that the counterweight base plate does not contact the carrier plate in the placed down state; and an upper counterweight element having a fastener for a direct fastening of the upper counterweight element to the superstructure.

13. The mobile crane in accordance with claim 1, wherein the at least two steps are shaped such that the widths of the at least two steps reduce upwardly from the carrier plate toward the connection region of the at least one connection element.

14. A counterweight device for a mobile crane having a travelable undercarriage, a superstructure rotatably supported on the undercarriage, and a counterweight device couplable to the superstructure, the counterweight device comprising a carrier plate on which one or more counterweight elements are stacked, and at least one connection element extending upward from the carrier plate to a connection region that couples the carrier plate to the superstructure for the counterweight device to be lifted by the superstructure, wherein the at least one connection element has at least two separate and spaced apart placement areas on which the one or more counterweight elements are placed such that (a) the one or more counterweight elements are not in contact with the carrier plate, (b) weight of the one or more counterweight elements is introduced into the at least one connection element, and (c) no force from the weight of the one or more counterweight elements is introduced onto the carrier plate when lifted by the counterweight device, wherein the at least one connection element includes at least two steps in a step structure with upper sides of the at least two steps forming multiple pairs of the at least two separate and spaced apart placement areas, the at least two steps forming the pairs of the at least two separate and spaced apart placement areas disposed at different heights above the carrier plate and disposed at different widths from a center of the at least one connection element with the steps located closer to the carrier plate being wider than the at least two steps located farther from the carrier plate, each of the at least two steps for receiving and supporting different ones of the counterweight elements to be supported upon while the counterweight elements are stacked on the at least one connection element without contacting the carrier plate.

15. A counterweight device configured to be coupled to a rotatable superstructure supported on a travelable undercarriage of a mobile crane, the counterweight device comprising:

a carrier plate; and a connection element coupled with and extending upward from the carrier plate, the connection element include a connection region at an end of the connection element that is opposite the carrier plate, the connection region configured to couple the carrier plate and the connection element to the superstructure above the carrier plate and the connection element, the connection element having placement areas above the carrier plate and positioned to support counterweight elements above the carrier plate, the placement areas positioned to (a) prevent contact between the counterweight elements and the carrier plate, (b) receive loads from the counterweight elements, and (c) prevent the loads from the counterweight elements from being introduced onto the carrier plate, wherein the connection element includes multiple steps with each step forming a different pair of the placement areas, the steps decreasing in width from the carrier plate to the connection region.

16. The counterweight device of claim 15, further comprising:

an intermediate plate sized for placement on the carrier plate outside of the placement areas of the connection element and between the counterweight elements and the carrier plate.

* * * * *